(No Model.)

O. NELSON.
FOOD STEAMER.

No. 317,839. Patented May 12, 1885.

WITNESSES:
C. Neveux
C. Sedgwick

INVENTOR:
O. Nelson
BY Munn & Co.
ATTORNEYS.

N. PETERS, Photo-Lithographer, Washington, D. C.

UNITED STATES PATENT OFFICE.

OLIVE NELSON, OF HOUGHTON LAKE, MICHIGAN.

FOOD-STEAMER.

SPECIFICATION forming part of Letters Patent No. 317,839, dated May 12, 1885.

Application filed June 10, 1884. (No model.)

*To all whom it may concern:*

Be it known that I, OLIVE NELSON, of Houghton Lake, of Roscommon county, Michigan, have invented a new and Improved Food-Steamer, of which the following is a full, clear, and exact description.

The object of my invention is to provide a new and improved steamer for steaming meat, vegetables, &c.

The invention consists in the construction and arrangement of parts, as will be hereinafter fully described and claimed.

Figure 1:
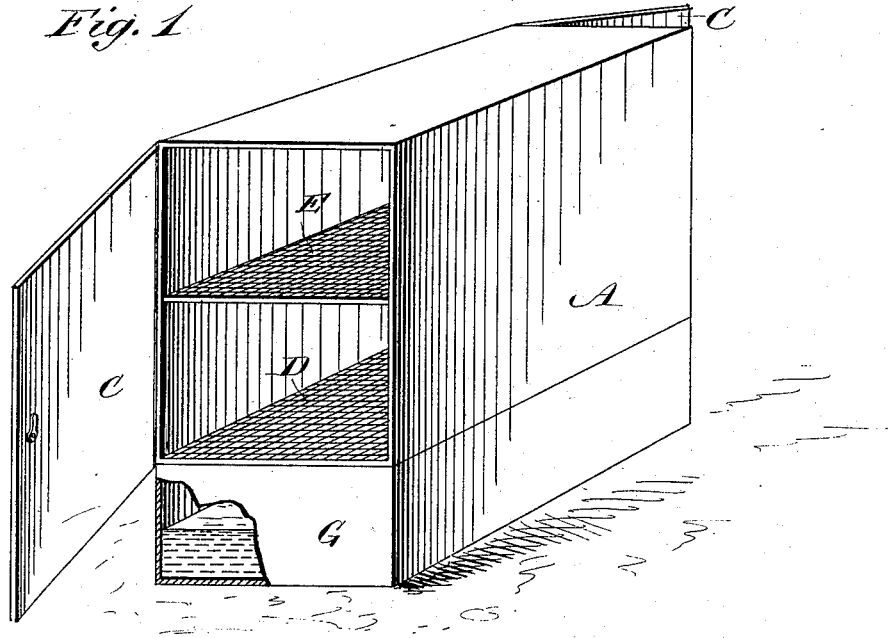
Figure 2:
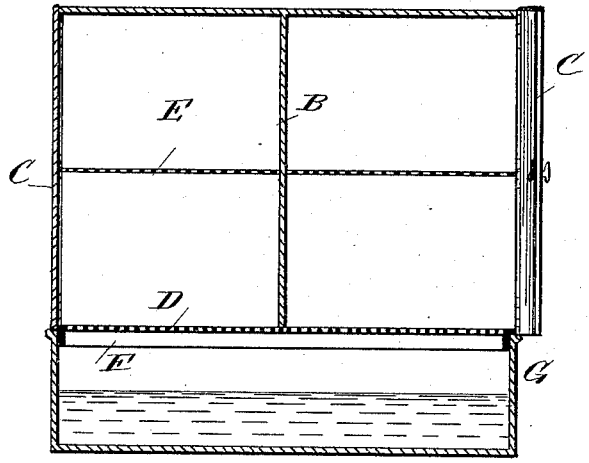

Figure 1 is a perspective view of my improved food-steamer, parts being broken out, and Fig. 2 is a longitudinal sectional elevation of the same.

A metal box, A, open at the bottom, is divided into two compartments by a transverse central partition, B, and is provided at each end with a door, C, having suitable devices for keeping it closed.

The box A is provided with a perforated bottom plate, D, or screen-bottom, and each compartment is provided with a horizontal perforated partition or screen, E, at about the middle of its height.

The perforated bottom is provided with a downwardly-projecting flange, F, a short distance from the edges, which flange fits within the opening of a pan, G.

Water is placed in the pan, the box A is placed on the pan, the food to be steamed is placed on the perforated bottom and the shelves or perforated horizontal partitions, and the doors are closed. If the pan is placed on the fire, the steam rises up into the compartments and steams the food on the perforated floor and perforated bottom and horizontal partitions or shelves.

I am aware that a steamer has been provided with two compartments having separate doors and removable perforated pans. To the bottom of the steamer a valved water-pan was secured. I do not claim such as of my invention.

Having thus described my invention, I claim as new and desire to secure by Letters Patent—

The food-steamer herein described, consisting of the box A, vertical partition B, perforated transverse portion E, perforated bottom D, doors C C, flange F on the under side of the box, and the removable water-vessel G, into which the flange F fits, substantially as set forth.

OLIVE NELSON.

Witnesses:
  H. H. WOODRUFF,
  ALECIA H. WOODRUFF.